(12) United States Patent
Lee et al.

(10) Patent No.: US 8,972,779 B2
(45) Date of Patent: Mar. 3, 2015

(54) METHOD OF CALCULATING PARITY IN ASYMETRIC CLUSTERING FILE SYSTEM

(75) Inventors: Sang Min Lee, Daejeon (KR); Hong Yeon Kim, Daejeon (KR); Young Kyun Kim, Daejeon (KR); Han Namgoong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 410 days.

(21) Appl. No.: 13/309,752

(22) Filed: Dec. 2, 2011

(65) Prior Publication Data

US 2012/0151255 A1  Jun. 14, 2012

(30) Foreign Application Priority Data

Dec. 8, 2010 (KR) .................. 10-2010-0125106

(51) Int. Cl.
*G06F 11/00* (2006.01)
*G06F 11/10* (2006.01)

(52) U.S. Cl.
CPC .... *G06F 11/1076* (2013.01); *G06F 2211/1028* (2013.01); *G06F 2211/1059* (2013.01)
USPC ............ 714/6.24; 714/6.1; 714/6.2; 714/6.31

(58) Field of Classification Search
USPC .................................. 714/6.1, 6.2, 6.24, 6.31
See application file for complete search history.

(56) References Cited

U.S. PATENT DOCUMENTS

| 5,905,847 | A | * | 5/1999 | Kobayashi et al. ........... 386/265 |
| 7,197,599 | B2 | | 3/2007 | Corrado |
| 8,200,933 | B2 | * | 6/2012 | Uppala ......................... 714/6.1 |
| 2006/0107096 | A1 | * | 5/2006 | Findleton et al. ................. 714/6 |
| 2008/0133967 | A1 | | 6/2008 | Lee et al. |
| 2009/0216832 | A1 | * | 8/2009 | Quinn et al. .................. 709/203 |
| 2011/0029809 | A1 | * | 2/2011 | Dhuse et al. ...................... 714/6 |

* cited by examiner

*Primary Examiner* — Joseph D Manoskey
(74) *Attorney, Agent, or Firm* — Ladas & Parry LLP (57) ABSTRACT

Disclosed is a method of calculating parity. The method dividing, by a client system, a file which is to be stored into chunks of a preset size and distributively storing the chunks in a plurality of data servers; sending, by the client system, a data write complete notification message to a metadata server; storing, by the metadata server, a file sent through the data write complete notification message in a recovery queue; and sending, by the metadata server, a random data server a parity calculation request for the file stored in the recovery queue.

17 Claims, 9 Drawing Sheets

METHOD OF CALCULATING PARITY IN ASYMETRIC CLUSTERING FILE SYSTEM

CROSS-REFERENCE TO RELATED APPLICATIONS

This application claims priority to and the benefit of Korean Patent Application No. 10-2010-0125106 filed in the Korean Intellectual Property Office on Dec. 8, 2010, the entire contents of which are incorporated herein by reference.

TECHNICAL FIELD

The present invention relates to a method of calculating parity in an asymmetric clustering file system, and more particularly, to a technique for asymmetrically processing data storage and parity calculation and distributively processing the parity calculation in a plurality of data servers in the structure where a file is divided into data chunks having a preset size in a file system and a parity chunk for error recovery is stored for every preset number of data chunks, thus distributing overhead caused by parity and enhancing efficiency.

BACKGROUND

In general, an asymmetric clustering file system includes a metadata server (MDS) managing metadata of a file, a plurality of data servers (DS) managing data of a file, and a plurality of client systems storing or searching a file. The metadata server, the plurality of data servers, and the plurality of client systems are connected to and interwork with one another through communication over a local network.

The plurality of data servers provide a single mass storage space using a virtualization technology, and the storage space may be freely managed by adding/deleting the data servers or volumes in the data servers. In consideration of a failure rate in proportion to the number of servers, such a system that manages a plurality of data servers mainly utilizes a method of providing parity for recovery while distributing data such as Redundant Array of Inexpensive Disks (RAID) level-5, or a mirroring technology that provides a copy of data. The mirroring technology is inefficient in terms of storage due to duplicated data storage. For this reason, a data distributive storage structure using parity is preferred in the case of requiring fault tolerance.

When an error occurs in a storage device that stores data, the data distributive storage structure using parity may recover data, stored in the storage device having an error, by using parity. A set of data constituting parity is called a stripe, and the number of parities generated for each stripe means the number of data servers allowing for data recovery without data low even if failure simultaneously occurs. For example, in the case where two parities are stored for each stripe, even if failure simultaneously occurs in two data servers storing data constituting a stripe, data stored in the two failed data servers can be recovered by using two parities and data servers other than the two failed servers.

According to the related art, data storage and parity calculation are symmetrically processed in the data distributive storage structure using parity. In other words, while parity calculation is performed in the units of stripes at the time when file data is stored in a client system, parity and data of a corresponding stripe are simultaneously stored in a plurality of data servers in a distributive manner. However, this causes overhead for parity calculation to be concentrated in a client, thus degrading efficiency.

SUMMARY

The present invention has been made in an effort to provide a method of calculating parity in an asymmetric clustering file system, capable of storing all data of a file in a plurality of data servers and then performing parity calculation in parallel in the plurality of data servers, in the structure where data and parity are distributively stored in the plurality of data servers in an asymmetric clustering file system, thus distributing overhead for parity calculation to a plurality of data servers and thus enhancing efficiency.

An exemplary embodiment of the present invention provides a method of calculating parity in an asymmetric clustering file system, including: dividing, by a client system, a file which is to be stored into chunks of a preset size, and distributively storing the chunks in a plurality of data servers; sending, by the client system, a data write complete notification message to a metadata server; storing, by the metadata server, a file sent through the data write complete notification message in a recovery queue; and sending, by the metadata server, a random data server a parity calculation request for the file stored in the recovery queue.

According to exemplary embodiments of the present invention, it is possible to distribute overhead for parity calculation to a plurality of data servers by allowing the plurality of data serves to perform parity calculation in parallel after all the data of a file is completely stored in the plurality of data servers. Accordingly, the degradation in data storage performance can be prevented, and an efficient parity operation can be supported.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. Like reference numerals in the drawings denote like elements, and thus their description will be omitted. Moreover, detailed descriptions related to well-known functions or configurations will be ruled out in order not to unnecessarily obscure subject matters of the present invention.

Figure 1:
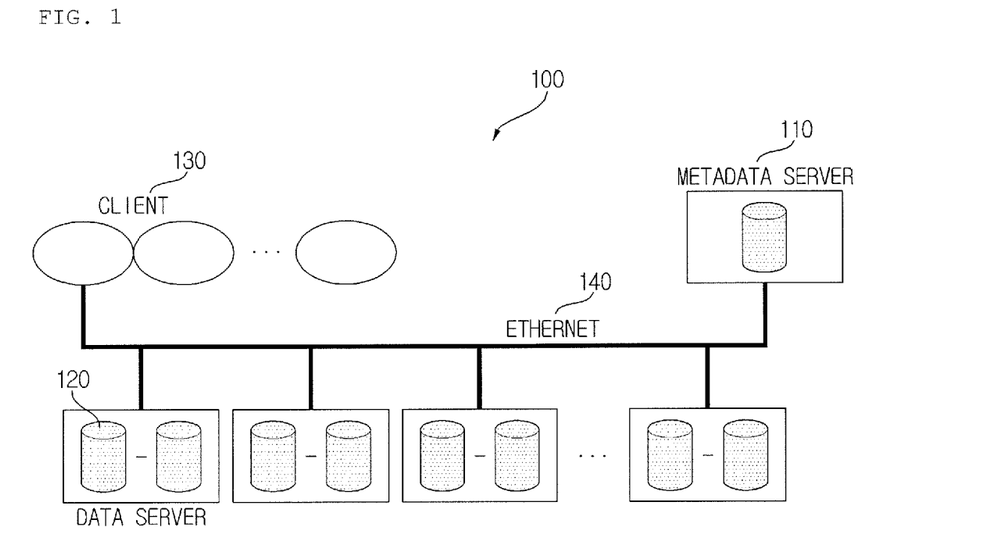
FIG. 1 is a view illustrating a structure of an asymmetric clustering file system.

FIG. 1 is a view illustrating a structure of an asymmetric clustering file system.

Referring to FIG. 1, an asymmetric clustering file system 100 includes a metadata server 110 managing metadata of a file, a plurality of data servers 120 managing data of a file, and a plurality of clients 130 accessing the plurality of data servers 120 and storing or searching a file. The metadata server 110, the plurality of data servers 120, and the plurality of clients 130 are connected to and interwork with one another by communicating over a network 140 such as Ethernet or the like.

The metadata server 110 is a storage space for metadata of a file, and may be implemented as a database, a local file system, or the like.

Each of the plurality of data servers 120 may be implemented as at least one disk storage device. In this case, the size of a storage space of each data server 120 is determined depending on the number of disks being mounted. Furthermore, the disk storage device storing data of a file may be implemented as a local file system or the like.

The plurality of clients 130 are terminals for storing or searching a file by accessing the plurality of data servers 120 through the network 140, and may be implemented as personal computers (PC), notebook computers, or the like.

Figure 2:
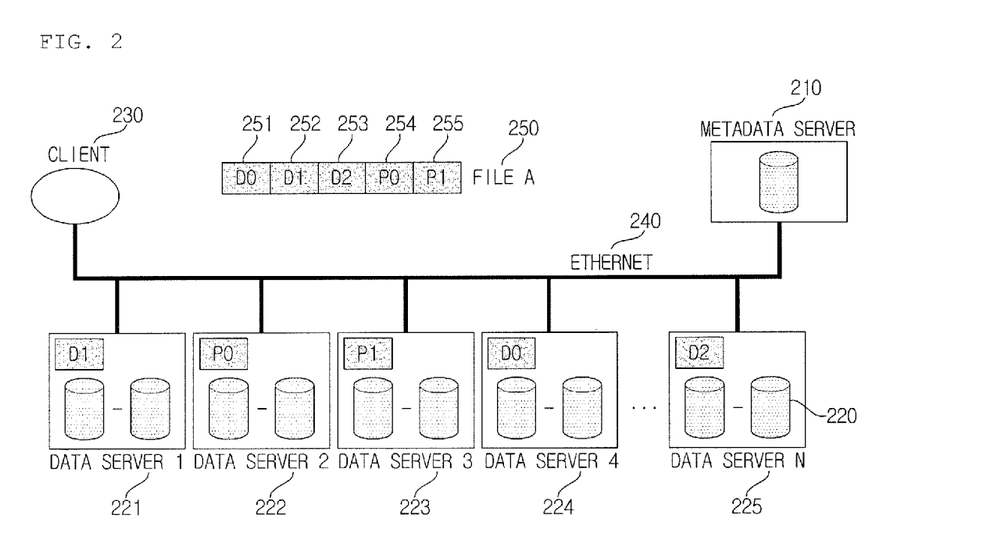
FIG. 2 is a view illustrating a method of distributively storing data and parity in an asymmetric clustering file system.

FIG. 2 is a view illustrating a method of distributively storing data and parity in an asymmetric clustering file system.

First, a client 230 divides file A 250 to be stored into units called chunks having a preset size. In this case, the size of a chunk is defined by a user configuring a file system and may be a value obtained by dividing a pre-fixed value or a file size by the number of data servers that are to store the file A 250.

After the file A 250 is divided, parity chunks 254 and 255 are generated for every preset number of data chunks 251, 252 and 253. Here, the number of data chunks and the number of generated parity chunks, constituting a stripe, may be defined by a user.

Thereafter, the data chunks 251, 252 and 253, and the parity chunks 254 and 255 are stored in a plurality of data servers 221, 222, 223, 224, and 225 in a distributive manner. In this case, a metadata server 210 may select data servers that are to store the data chunks and the parity chunks in consideration of the respective utilization rates of the storage spaces of the data servers or the like, and then inform the client 230 of the result of selection.

Figure 3:
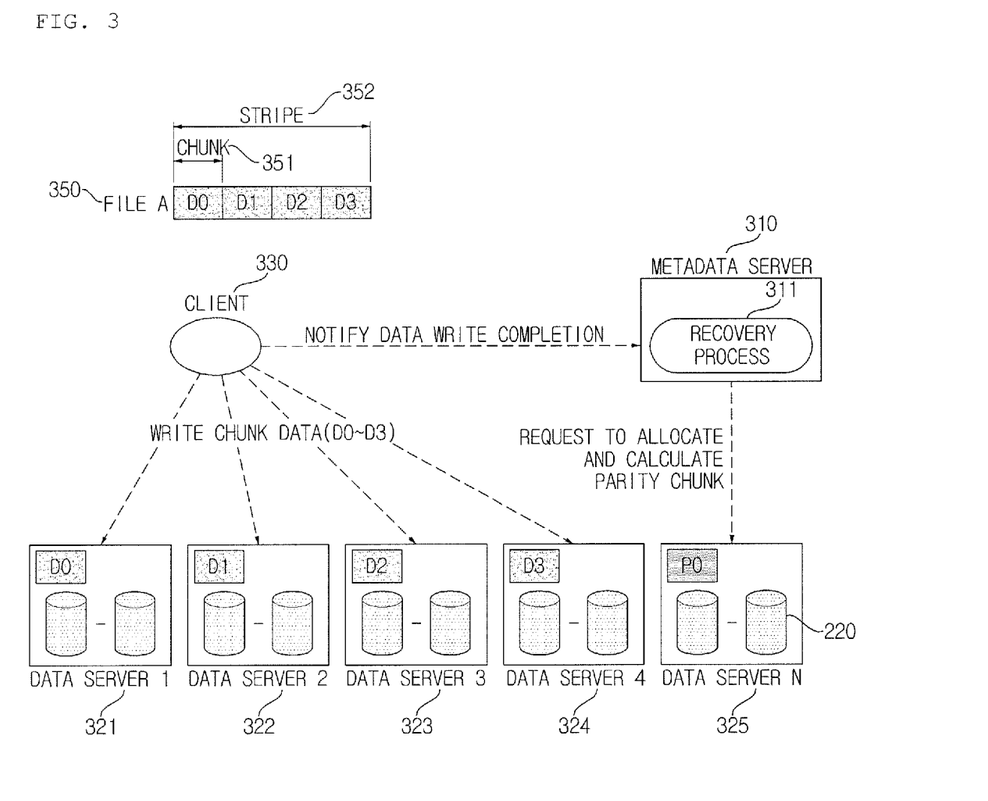
FIG. 3 is a view illustrating an operational structure of an asymmetric clustering file system for asymmetrically processing data storage and parity calculation according to an exemplary embodiment of the present invention.

FIG. 3 is a view illustrating an operational structure of an asymmetric clustering file system for asymmetrically processing data storage and parity calculation according to an exemplary embodiment of the present invention.

First, a client 330 divides file A 350 to be stored into chunks 351, which are predetermined units having a preset size, and a preset number of chunks are grouped into a stripe 352 and distributively stored in data servers 321, 322, 323, and 324 indicated by a metadata server 310.

When the file storage is completed, the client 330 sends a message reporting the completion of data write (i.e., a data write complete notification message) to the metadata server 310.

In response, the metadata server 310 stores a corresponding file, sent in the data write complete notification message, in a recovery queue (not shown) managed by a recovery process 311, and returns a response to the client 330. In this case, the recovery queue stores therein a file identifier having a unique identifier, such as a file path name or an i-node of a file, or the like in order to check metadata information of a corresponding file.

The recovery process 311 may be operated in the form of an independent process or a daemon thread generated from a metadata server process, and may instruct a data server to perform parity calculation and erroneous data recovery with respect to a file stored in the recovery queue.

Figure 4:
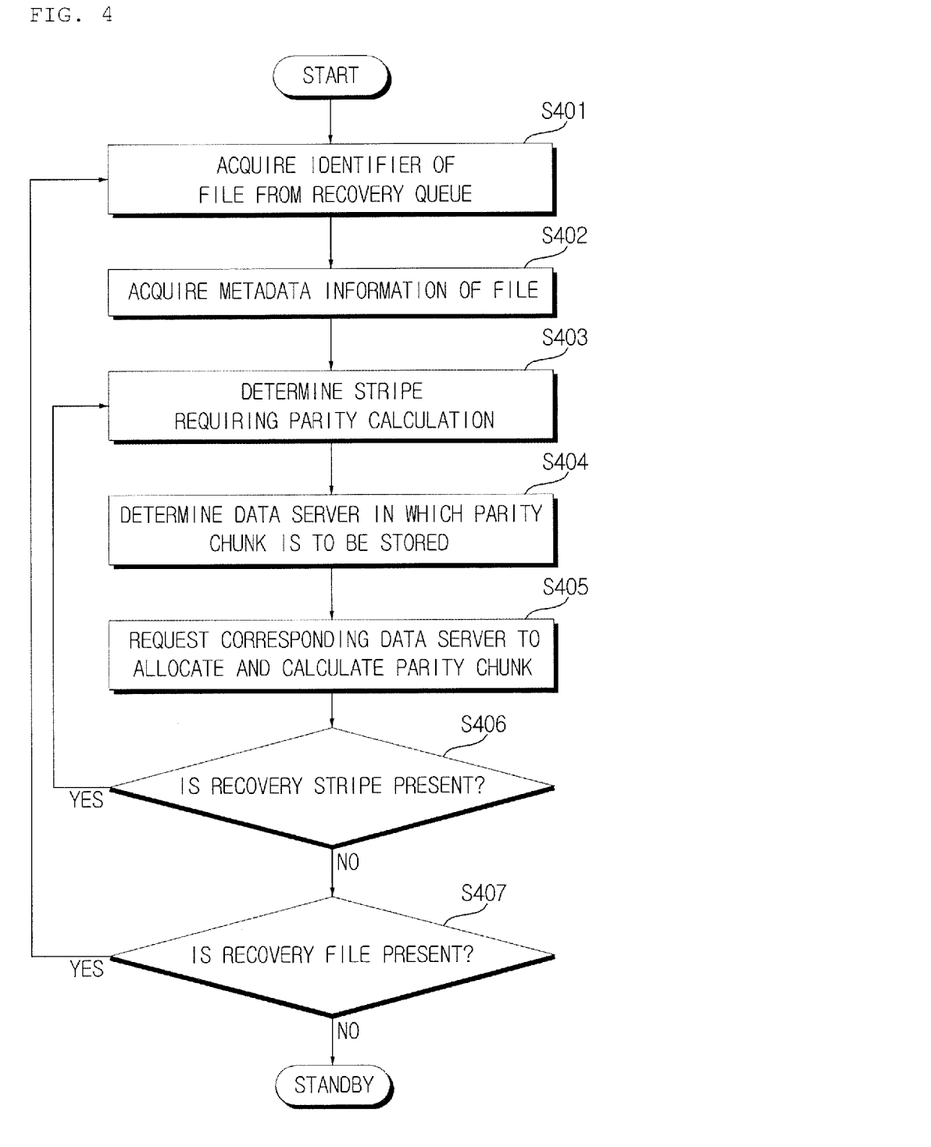
FIG. 4 is a flowchart of a recovery process for parity calculation in a metadata server of an asymmetric clustering file system according to an exemplary embodiment of the present invention.

FIG. 4 is a flowchart of processing a recovery process for parity calculation in a metadata server of an asymmetric clustering file system according to an exemplary embodiment of the present invention.

A recovery process in a standby mode in a metadata server sequentially processes a file stored in a recovery queue.

First, an identifier of a file is acquired from the recovery queue in operation S401, and metadata information of the corresponding file is acquired from a metadata storage unit in operation S402. In this case, the metadata information of the file contains basic file information and information regarding data servers and disks storing data chunk in the units of stripes.

Thereafter, a stripe which requires parity calculation is determined in operation S403, a data server that is to store a parity chunk of the corresponding stripe is determined in operation S404, and then, the corresponding data server is requested to allocate and calculate a parity chunk in operation S405. It may be determined by a user whether to execute a synchronous scheme of waiting for the reception of a completion response after the request for the allocation and calculation of a parity chunk is sent to the data server, or to execute an asynchronous scheme of separately processing a completion response after the request is sent.

Thereafter, it is checked if a stripe requiring parity calculation is further present in the corresponding file in operation S406, and the above operations S403 to S405 are repeated for the stripe that requires parity calculation.

Furthermore, when the processing upon the corresponding file is completed, the presence of the next file in the recovery queue is checked in operation S407, and the above parity calculation operations S401 to S406 are repeated for the next file.

When there is no file in the recovery queue, the recovery process is switched to a standby mode.

Figure 5:
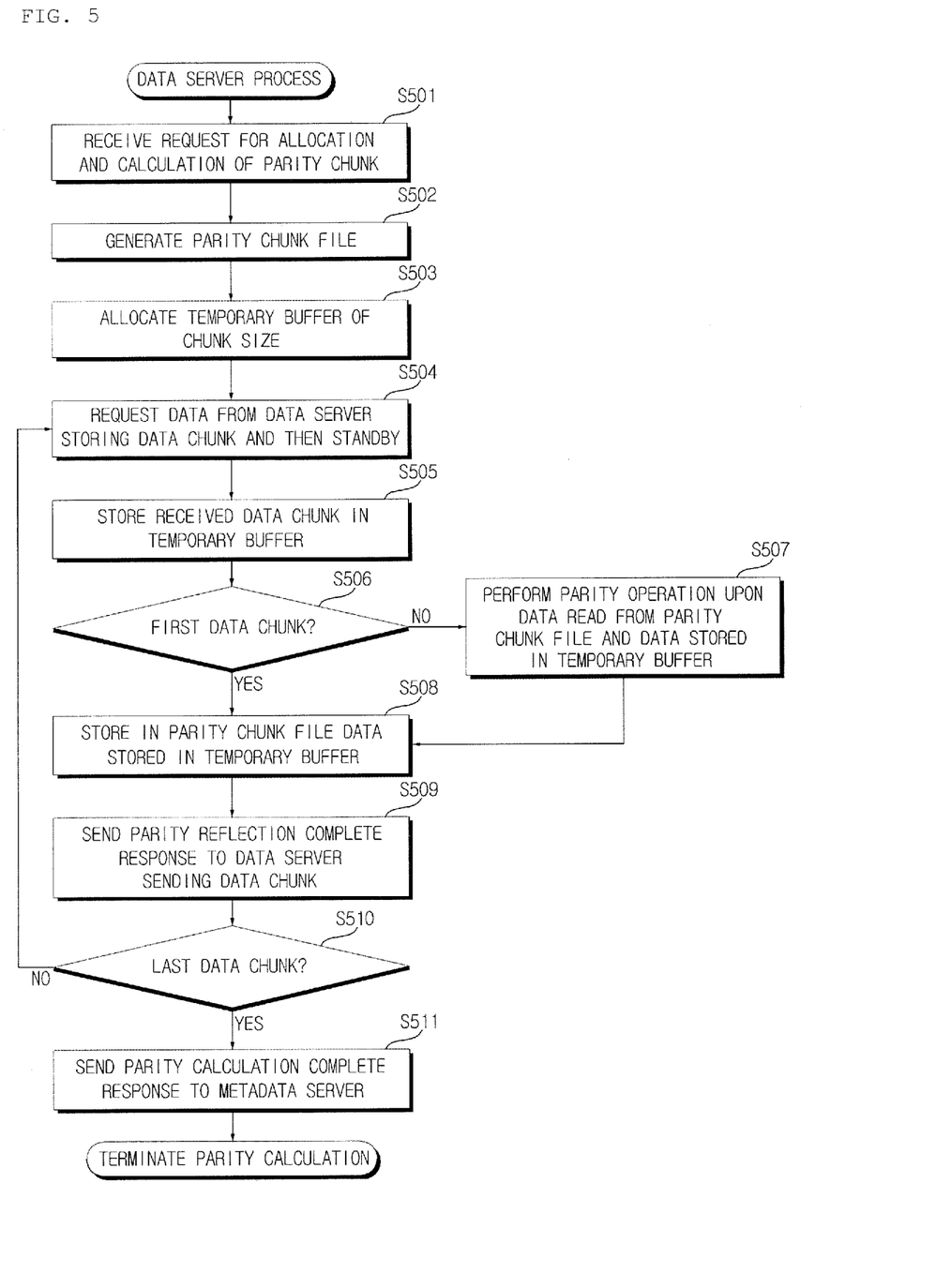
FIG. 5 is a flowchart of processing a received parity calculation request in a data server of an asymmetric clustering file system according to an exemplary embodiment of the present invention.

FIG. 5 is a flowchart of processing a received parity calculation request in a data server of an asymmetric clustering file system according to an exemplary embodiment of the present invention.

First, a data server process receives a request for the allocation and calculation of a parity chunk including stripe information from a metadata server in operation S501. In this case, the stripe information contains a list of data chunks constituting a stripe, and information regarding disks and data servers storing the respective data chunks.

Thereafter, the data server process generates a parity chunk file in which parity is to be stored in a data storage unit in operation S502, and allocates a temporary buffer having a chunk size, which is to be used for a parity operation in operation S503.

Thereafter, the data server process sends a data request for parity calculation to a data server storing the first data chunk of the received list of data chunks, and waits for a response in operation S504. Data received together with the response to the data request is stored in the temporary buffer in operation S505, and subsequently, checks whether or not the data is the first data chunk in operation S506.

When the data is the first data chunk, the data stored in the temporary buffer is stored in the parity chunk file in operation S508. When the data is not the first data chunk, a parity operation is performed upon data read from the parity chunk file and the data stored in the temporary buffer in operation S507, and then, the data stored in the temporary buffer is stored in the parity chunk file in operation S508.

When the storage in the parity chunk file is completed, a response indicating the completion of parity reflection (i.e., a parity reflection complete response) is sent to a data server having sent the corresponding data chunk in operation S509.

The above processes S504 to S509 are repeatedly performed until the last data chunk of the corresponding stripe in operation S510.

When the parity operation for every data chunk constituting the corresponding stripe is completed, a response indicating the completion of parity calculation (i.e., a parity calculation complete response) is sent to the metadata server in operation S511, and the parity calculation process is terminated.

Figure 6A:
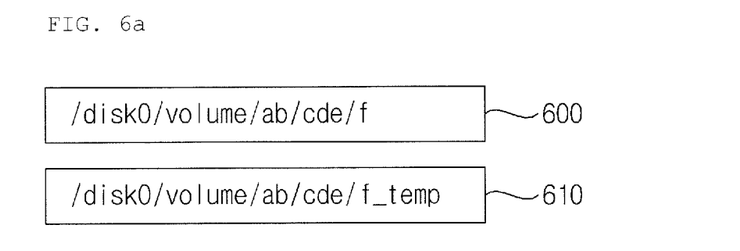
FIG. 6A is a view illustrating a file management structure storing chunk data in a data server of an asymmetric clustering file system according to an exemplary embodiment of the present invention.

FIG. 6A is a view illustrating a file management structure for storing chunk data in a data server of an asymmetric clustering file system according to an exemplary embodiment of the present invention.

Referring to FIG. 6A, /disk0/volume indicates a path of a data storage unit, and a chunk file stores a chunk identifier as a directory structure. Accordingly, /ab/cde/f 600 means that chunk data having a chunk identifier (0×abcdef) is stored in file name f. The corresponding file is generated when the chunk data is initially stored, and storing data which is last reflected in parity.

Furthermore, file name /ab/cde/f_temp 610 is a chunk temporary file for file f, and stores new data requested to be written in a chunk file after the last parity reflection. The chunk temporary file is stored in the same directory as the original chunk file f, and the file name thereof is generated by attaching a specific suffix (_temp) defined by a user after the original file name.

The reason why the chunk temporary file is used is to recover an error occurring in another data chunk before updated data is reflected in parity because parity calculation and data update are asymmetrically performed. In the case where a data chunk is updated to new data but has not been reflected in parity yet, if error data is recovered using the updated data chunk, data other than the original data may be erroneously recovered. Therefore, data finally reflected in parity needs to be maintained in a corresponding data server until updated data is reflected in parity.

Figure 6B:
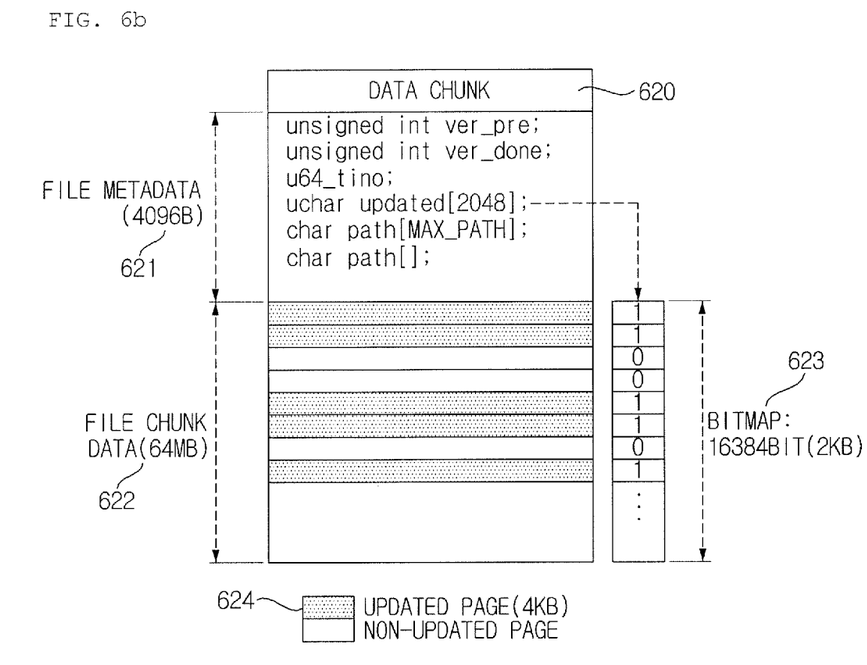
FIG. 6B is a view illustrating a metadata structure of a chunk temporary file in a data server of an asymmetric clustering file system according to an exemplary embodiment of the present invention.

FIG. 6B is a view illustrating a metadata structure of a chunk temporary file in a data server of an asymmetric clustering file system according to an exemplary embodiment of the present invention.

A data chunk 620 is stored as a file in a local file system of a data server. In this case, the size of a chunk may be determined by a user when a corresponding storage volume is configured in the metadata server. A chunk file consists of a header 621 storing metadata information, and data 622. The size of file metadata may be defined by a user, and information required in managing the corresponding chunk data, such as a chunk version, a fine i-node number, a file path name, or the like, may be stored therein.

Furthermore, an update bitmap 623 indicating whether or not update has been made in units of pages constituting chunk data is defined in metadata information of a chunk temporary file. The update bitmap 623 may divide chunk data into data sizes (4 KB) and define a bit for each page. For example, in the case where the chunk size is 64 MB and thus there are 16,384 pages, approximate 2 Kbytes are allocated for the bitmap size. Each bit means that data corresponding to an offset within a chunk is present in a chunk file and a chunk temporary file. If a bit is 1, it means that data of the chunk temporary file is recently updated data 624, and data in the chunk file is the last data reflected in parity. If a bit is 0, it means that data of a corresponding offset exists in only the chunk file.

Figure 7:
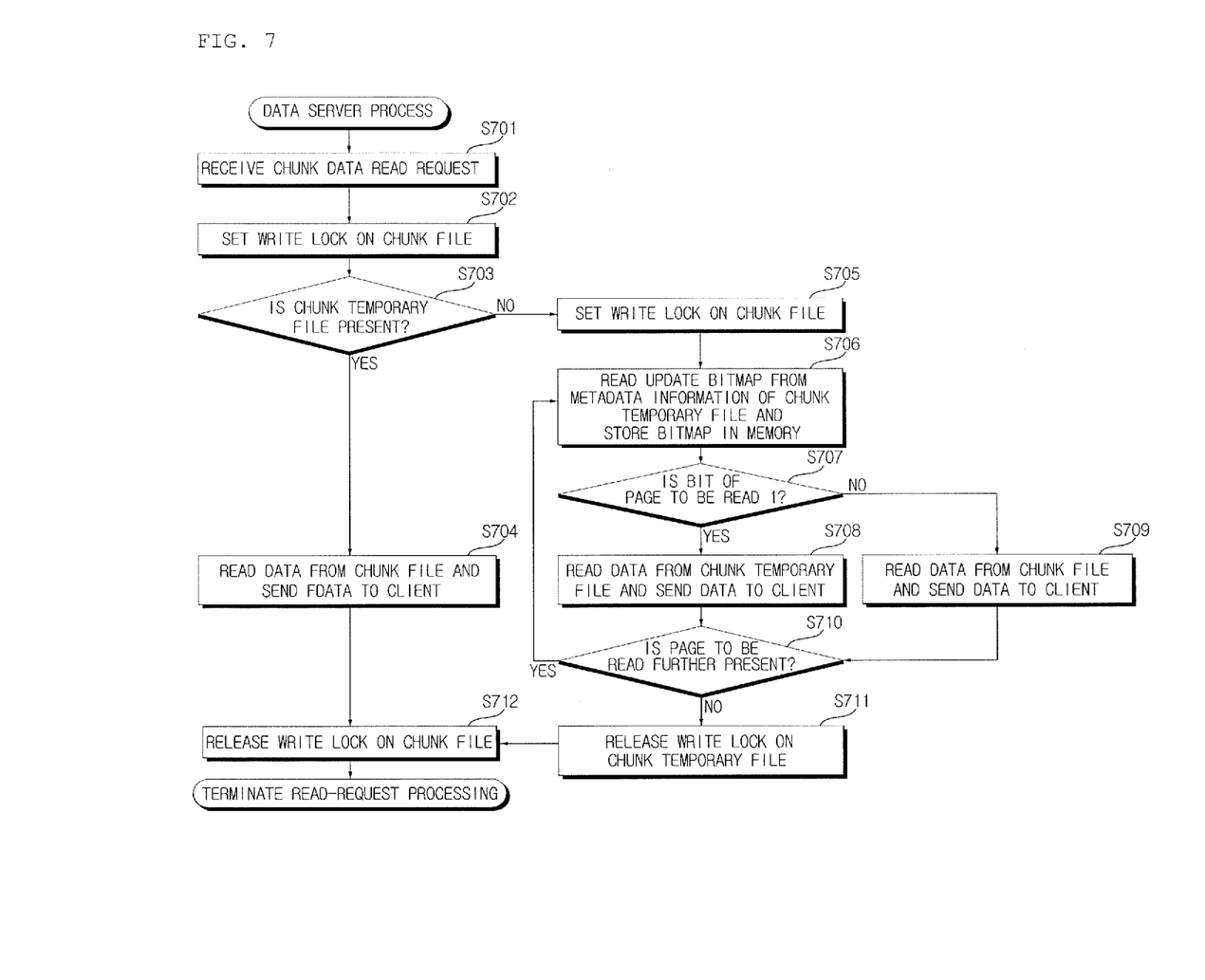
FIG. 7 is a flowchart of processing a chunk data read request from a client in a data server of an asymmetric clustering file system according to an exemplary embodiment of the present invention.

FIG. 7 is a flowchart of processing a chunk data read request from a client in a data server of an asymmetric clustering file system according to an exemplary embodiment of the present invention.

When a data server process receives a chunk data read request from a client in operation S701, a file write lock is set on a corresponding chunk file in operation S702, and a function of a local file system is utilized.

Thereafter, it is checked whether or not a chunk temporary file exists in operation S703. When the chunk temporary file does not exist, data is read from the corresponding chunk file and sent to the client in operation S704. Thereafter, the write lock on the chunk file is released in operation S712, and processing in response to the read request is terminated.

When the chunk temporary file exists, a write lock is set on the chunk temporary file in operation S705, and an update bitmap is read from metadata information of the chunk temporary file and stored in a memory in operation S706. Thereafter, it is checked whether or not update is made in the units of pages from a start offset of data to be read, that is, it is checked whether or not a bit of an update bitmap of a page to be read is 1 in operation S707. When the bit of the page is 1, data is read from the chunk temporary file and sent to the client in operation S708. When the bit of the page is 0, data is read from a chunk file and sent to the client in operation S709. In this case, consecutive pages having the same bit may be collectively processed. When a data read operation upon every page is completed in operation S710, a write lock on the chunk temporary file is released in operation S711, a write lock on the chunk file is then released in operation S712, and then processing in response to the read request is terminated.

Figure 8:
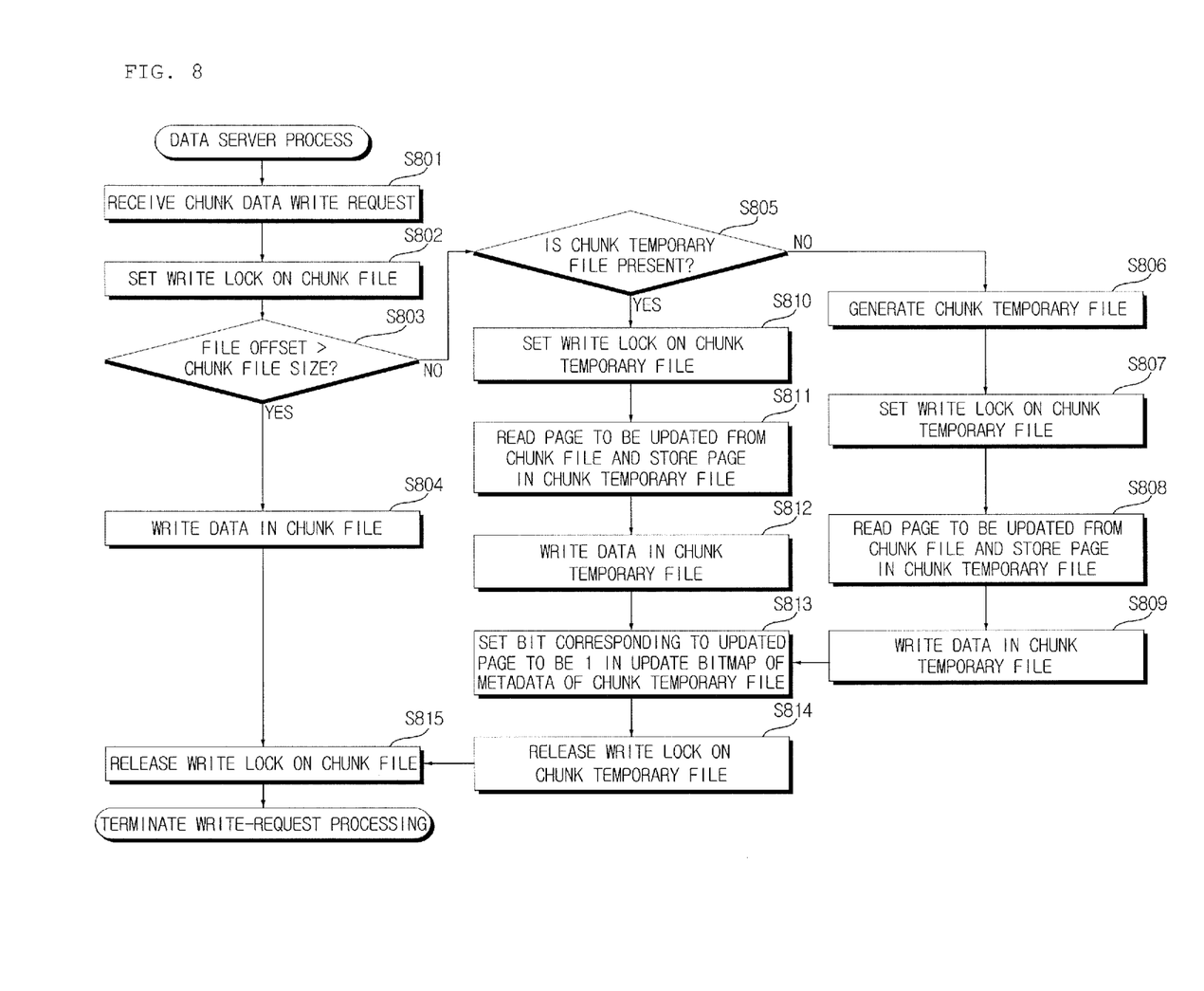
FIG. 8 is a flowchart of processing a chunk data write request from a client in a data server of an asymmetric clustering file system according to an exemplary embodiment of the present invention.

FIG. 8 is a flowchart of processing a chunk data write request from a client in a data server of an asymmetric clustering file system according to an exemplary embodiment of the present invention.

When a data server process receives a chunk data write request from a client in operation S801, a file write lock is set on a corresponding chunk file in operation S802.

Thereafter, it is checked whether or not a chunk file offset to be written is greater than the size of the chunk file in operation S803. If the chunk file offset is greater, data is stored in the chunk file in operation S804, a write lock on the chunk file is released in operation S815, and processing in response to the write request is terminated.

In contrast, when the chunk file offset is not greater, it is checked whether or not a chunk temporary file is present in operation S805. When the chunk temporary file is present, a write lock on the chunk temporary file is set in operation S810. In the case where only a portion of a page storing data is updated, data of the page to be updated is read from a chunk file and stored in the chunk temporary file in operation S811, and new data is stored in a corresponding page of the chunk temporary file in operation S812. However, if a chunk temporary file is not present yet, a chunk temporary file is generated in operation S806, and a write lock on the chunk temporary file is set in operation S807. In the case where only a portion of a page where data is stored is updated, data of the page to be updated is read from the chunk file and stored in the chunk temporary file in operation S808, and new data is stored in a corresponding page of the chunk temporary file in operation S809. Thereafter, a bit corresponding to the updated page is set to be 1 in the update bitmap of the metadata of the chunk temporary file in operation S813. When the write operation is completed, the write lock on the chunk temporary file is released in operation S814, the write lock on the chunk file is then released in operation S815, and processing in response to the write request is terminated.

Figure 9:
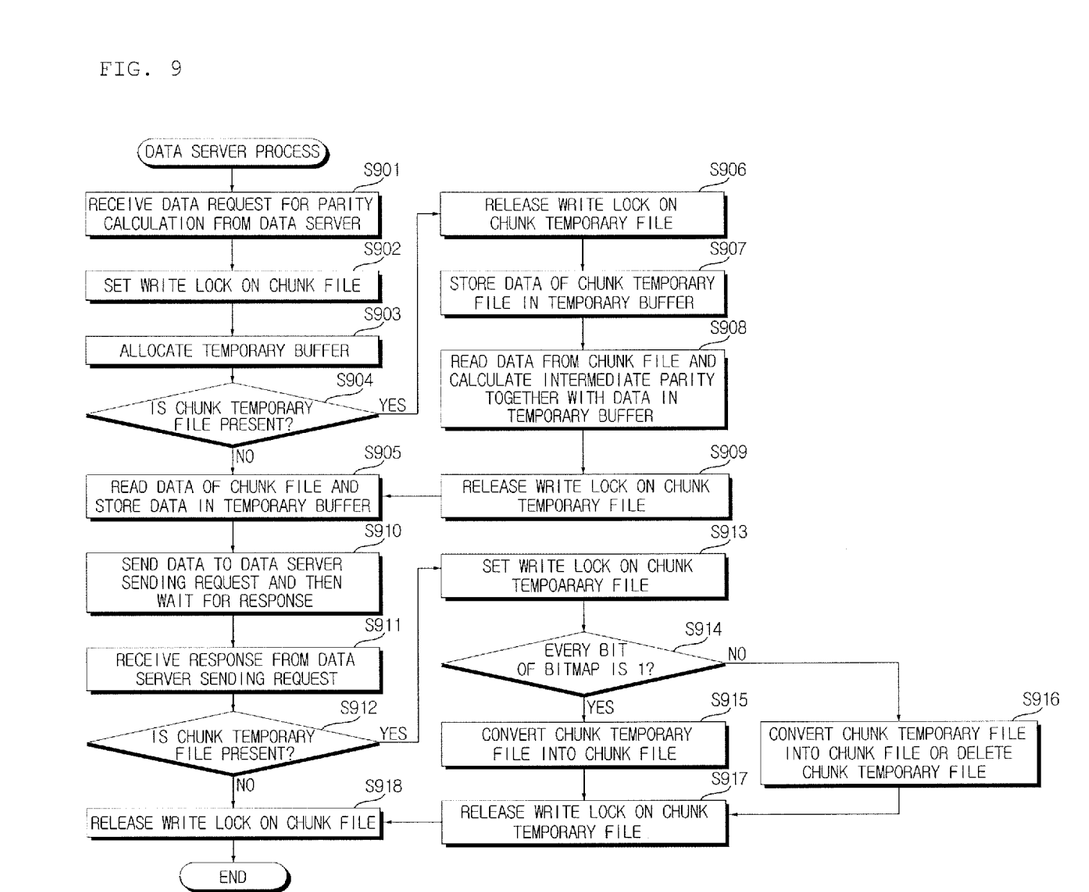
FIG. 9 is a flowchart of processing a chunk data request for parity calculation in a data server of an asymmetric clustering file system according to an exemplary embodiment of the present invention.

FIG. 9 is a flowchart of processing a chunk data request for parity calculation in a data server of an asymmetric clustering file system according to an exemplary embodiment of the present invention.

When a data server process receives a data request for parity calculation from a data server responsible for parity calculation in operation S901, a write lock on a corresponding chunk file is set in operation S902, and a temporary buffer which is to store data is allocated in operation S903.

Thereafter, it is checked whether or not a chunk temporary file is present in operation S904. If the chunk temporary file is not present, data is read from the chunk file and stored in a temporary buffer in operation S905.

In contrast, when the chunk temporary file is present, a write lock on the chunk temporary file is set in operation S906, data is then read from the chunk temporary file and stored in the temporary buffer in operation S907, and an exclusive-OR operation is performed upon data read from the chunk file and the data stored in the temporary buffer, thus calculating an intermediate parity in operation S908. When the calculation of the intermediate parity is completed, the write lock on the chunk temporary file is released in operation S909.

Thereafter, the data stored in the temporary buffer is sent to a data server that made the request for data, and waits for a response in operation S910.

If a response is received from the data server that made the request for data in operation S911, it means the completion of parity reflection. Accordingly, the chunk temporary file and the chunk file are merged by the following process.

First, the presence of the chunk temporary file is checked in operation S912. When the chunk temporary file exists, a write lock on the chunk temporary file is set in operation S913, and it is checked whether or not every bit of an update bitmap is 1 in operation S914.

If every bit is 1, it means the entirety of the chunk has been updated, and thus the chunk temporary file is converted into the chunk file in operation S915. If not every bit is 1 and the number of 1-bits is greater than the number of 0-bits, data of a page of 0-bit is copied from a chunk file to the chunk temporary file, and the chunk temporary file is then converted into the chunk file. If the number of 0-bits is greater, data of a page of 1-bit is copied from the chunk temporary file to a chunk file, and the chunk temporary file is then deleted in operation S916.

When the merger of a chunk temporary file and a chunk file is completed, the write lock on the chunk temporary file is released in operation S917, the write lock on the chunk file is released in operation S918, and then, processing in response to the data request is terminated.

Figure 10:
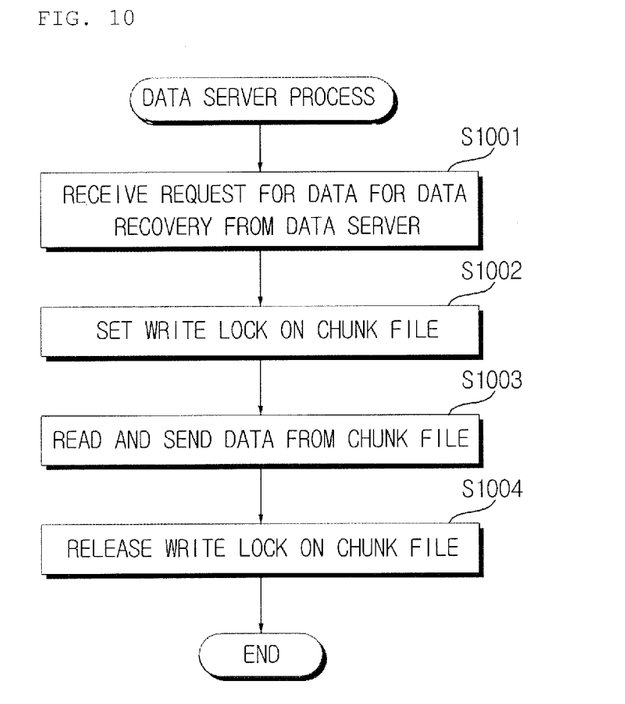
FIG. 10 is a flowchart of processing a chunk data request for chunk recovery in a data server of an asymmetric clustering file system according to an exemplary embodiment of the present invention.

FIG. 10 is a flowchart of processing a chunk data request for data chunk recovery in a data server of an asymmetric clustering file system according to an exemplary embodiment of the present invention.

To recover a data chunk in an asymmetric clustering file system according to an exemplary embodiment of the present invention, a metadata server determines a data server which is to store a recovered data chunk, and transmits a recovery request to the corresponding data server. A user may define whether to asymmetrically or symmetrically process the recovery request.

A data server, that receives from the metadata server the recovery request containing information regarding a stripe to which recovery data belongs, requests data sequentially from the first data chunk constituting the stripe.

When a data server process receives a data request for data chunk recovery from the data server having received the recovery request in operation S1001, a write lock on a corresponding chunk file is set in operation S1002.

Thereafter, data of a requested size is read from the chunk file and sent to a data server having sent a data request in operation S1003.

Subsequently, when a data reception complete response is received from the data server having sent the data request, the write lock on the corresponding chunk file is released in operation S1004, and processing in response to the data request is terminated.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of calculating parity, comprising:
dividing, by a client system, a file which is to be stored into chunks of a preset size, and distributively storing the chunks in a plurality of data servers;
sending, by the client system, a data write complete notification message to a metadata server;
storing, by the metadata server, a file sent through the data write complete notification message in a recovery queue;
sending, by the metadata server, a random data server a parity calculation request for the file stored in the recovery queue; and
performing a parity operation by the data server receiving the parity calculation request
wherein the performing of the parity operation includes:
receiving a request for allocating and calculatinq a parity, chunk containing information regarding a stripe from the metadata server,
generating a parity chunk file which is to store parity;
allocating a temporary of a chunk size, which is to be used for the parity operation;
requesting data for parity calculation from a data server storing a data chunk constituting the stripe, and storing received data in the temporary buffer;
storing the data, stored in the temporary buffer, in the parity chunk file when the received data is a first data chunk;
performing the parity operetion upon the data read from the parity chunk file and the data stored in the temporary buffer when the received data is not a first data chunk, and storing the data, stored in the temporary buffer, in the parity chunk file;
sending a parity reflection complete response to the data server sending the data chunk; and
sending a parity calculation complete response to the metadata server when parity operation for every data chunk constituting the stripe is completed.

2. The method of claim 1, wherein, in the distributively storing of the chunks in the plurality of data servers, the divided chunks are distributively stored in a plurality of data servers indicated by the metadata server.

3. The method of claim 1, wherein, in the storing of the file in the recovery queue, a path name or an identifier of the sent file is stored.

4. The method of claim 1, wherein the sending of the parity calculation request to the random data server includes:
acquiring an identifier of the file from the recovery queue;
acquiring metadata information of the file from a metadata storage unit;
determining a stripe requiring parity calculation;
determining a data server that is to store a parity chunk of the stripe; and
requesting the determined data server to allocate and calculate a parity chunk.

5. The method of claim 1, wherein the performing of the parity operation further includes:
allocating, by a data server receiving a data request for the parity calculation, a temporary buffer which is to store data;
reading data from a chunk file and storing the data in the temporary buffer when a chunk temporary file is not present;
when a chunk temporary file is present reading data from the chunk temporary file, storing the data in the temporary buffer, and calculating an intermediate parity; and
sending the data stored in the temporary buffer to a data server requesting data.

6. The method of claim 5, wherein the performing of the parity operation further includes merging the chunk temporary file and the chunk file when a response is received from the data server requesting the data.

7. The method of claim 6, wherein the merging of the chunk temporary file and the chunk file comprises:
checking whether or not every bit of an update bitmap of metadata of the chunk temporary file is 1;
converting the chunk temporary file into the chunk file when every bit is 1;
when the number of 1-bits is greater than the number of 0-bits, copying data of a page of 0-bits from the chunk file to the chunk temporary file, and converting the chunk temporary file into the chunk file; and
when the number of 0-bits is greater than the number of 1-bits, copying data of a page of 1-bits from the chunk temporary file to the chunk file, and deleting the chunk temporary file.

8. The method of claim 1, further comprising processing, by a data server receiving a chunk data read request from the client system, the read request.

9. The method of claim 8, wherein the processing of the read request includes:
checking presence of a chunk temporary file;
when the chunk temporary file is not present, reading data from a chunk file and sending the data to the client system; and
when the chunk temporary file is present, reading data from the chunk temporary file and sending the data to the client system in the case of a page where a bit of an update bitmap of metadata of the chunk temporary file is 1, and reading data from the chunk The and sending the data to the client system in the case of a page where a bit is 0.

10. The method of claim 1, further comprising processing, by a data server receiving a chunk data write request from the client system, the write request.

11. The method of claim 10, wherein the processing of the write request includes:
storing data in a chunk file when a chunk the offset is greater than a size of the chunk file;
checking presence of a chunk temporary file when the chunk file offset is not greater than the size of the chunk file;
reading data of a page which is to be updated from the chunk file to the chunk temporary file when the chunk temporary file is present and storing the data in a corresponding page of the chunk temporary file, and generating a chunk temporary file when the chunk temporary file is not present, then reading data of a page to be updated from the chunk file to the generated chunk temporary file, and storing the data in a corresponding page of the generated chunk temporary file; and
setting a bit corresponding to the updated page to be 1 in an update bitmap of metadata of the chunk temporary file.

12. The method of claim 1, further comprising sending, by the metadata server, a recovery request to a data server which is to store a recovered data chunk.

13. The method of claim 12, further comprising:

requesting, by the data server receiving the recovery request, a data chunk from a data server storing a data chunk constituting a stripe to which recovery data belongs; and reading, by the data server receiving the request for the data chunk, requested data from a chunk file and sending the data to the data server receiving the recovery request.

14. A method of calculating parity, comprising:

dividing a file into chunks of a preset size and distributively storing the chunks of the file in a plurality of data servers;

storing a file sent through a data write complete notification message in a recovery queue; and performing a parity operation, comprising:

receiving a request for calculating a parity chunk containing information regarding a stripe comprising a plurality of the divided chunks;

generating a parity chunk file which is to store parity;

allocating a temporary buffer of a chunk size;

requesting data for parity calculation and storing the requested data in the temporary buffer;

storing the data, stored in the temporary buffer, in the parity chunk file when the received data is a first data chunk; and performing the parity operation upon the data read from the parity chunk file and the data stored in the temporary buffer when the received data is not a first data chunk, and storing the data, stored in the temporary buffer, in the parity chunk file.

15. The method of claim 14 further comprising:

sending a parity calculation complete message when parity operation for every data chunk constituting the stripe is completed.

16. A method of calculating parity, comprising:

dividing a file into chunks of a preset size and distributively storing the chunks of the file in a plurality of data servers;

storing a file in a recovery queue;

processing a read request, comprising:

checking for presence of a chunk temporary file;

when the chunk temporary file is not present, reading data from a chunk file from the divided file, and sending the data to a client system; and when the chunk temporary file is present, reading data from the chunk temporary file and sending the data to the client system in the case of a page where a bit of an update bitmap of metadata of the chunk temporary file is 1, and reading data from the chunk file and sending the data to the client system in the case of a page where a bit is 0.

17. The method of claim 16 further comprising:

sending a data write complete notification message to a metadata server; and sending, by the metadata server, a random data server a parity calculation request for the file stored in the recovery queue.

* * * * *